US012771662B2

(12) United States Patent
Michaelis et al.

(10) Patent No.: US 12,771,662 B2
(45) Date of Patent: Oct. 20, 2026

(54) AUTOMATIC GRAPHIC RESPONSE REPRESENTING A USER'S REACTION TO A RECEIVED COMMUNICATION

(71) Applicant: Avaya Management L.P., Morristown, NJ (US)

(72) Inventors: Paul Roller Michaelis, Louisville, CO (US); Kevin Archer, Brighton, CO (US)

(73) Assignee: Avaya Management L.P., Morristown, NJ (US)

(*) Notice: Subject to any disclaimer, the term of this patent is extended or adjusted under 35 U.S.C. 154(b) by 75 days.

(21) Appl. No.: 18/901,213

(22) Filed: Sep. 30, 2024

(65) Prior Publication Data

US 2026/0095428 A1 Apr. 2, 2026

(51) Int. Cl.
*H04L 51/21* (2022.01)
*G06F 3/01* (2006.01)
*G06V 40/16* (2022.01)
*G06V 40/20* (2022.01)

(52) U.S. Cl.
CPC .............. *H04L 51/21* (2022.05); *G06F 3/013* (2013.01); *G06V 40/174* (2022.01); *G06V 40/20* (2022.01)

(58) Field of Classification Search
CPC ....... H04L 51/21; G06F 3/013; G06V 40/174; G06V 40/20
USPC .......................................................... 709/206
See application file for complete search history.

(56) References Cited

U.S. PATENT DOCUMENTS

| | | | | |
|---|---|---|---|---|
| 11,797,153 | B1 * | 10/2023 | Candelore | G06F 40/30 |
| RE50,264 | E * | 1/2025 | Pantazelos | G06F 21/10 |
| 12,406,405 | B2 * | 9/2025 | Eluvan | H04N 21/2187 |
| 2022/0376927 | A1 * | 11/2022 | Kim | H04L 9/3247 |
| 2023/0333867 | A1 * | 10/2023 | Agarwal | G06F 40/35 |
| 2025/0279100 | A1 * | 9/2025 | Maizels | G06V 40/20 |
| 2025/0384051 | A1 * | 12/2025 | Frank | G06F 16/24578 |

FOREIGN PATENT DOCUMENTS

| | | | |
|---|---|---|---|
| AU | 2012258940 A1 * | 12/2013 | G06F 3/14 |

* cited by examiner

*Primary Examiner* — Lan Dai T Truong

(57) ABSTRACT

The technology disclosed herein enables users on text-based communication threads to automatically receive indications of other users' visual reactions to received messages. In a particular example, a method includes receiving, at a first endpoint, a text communication in a text-communication thread from a second endpoint and presenting the text communication to a first user of the first endpoint. The method further includes capturing an image of the first user during presentation of the text communication. The method also includes determining a graphic corresponding to a visual reaction of the first user captured in the image and transmitting the graphic from the first endpoint to the second endpoint for display by the second endpoint in the text-communication thread.

20 Claims, 8 Drawing Sheets

100

AUTOMATIC GRAPHIC RESPONSE REPRESENTING A USER'S REACTION TO A RECEIVED COMMUNICATION

BACKGROUND

An important benefit of in-person conversations is the person who is speaking receives immediate visual feedback—notably via the gestures and facial expressions of the listeners—that can allow the speaker to do real-time assessments of how the speech is being received. Based on those assessments, the speaker can make adjustments or clarifications. For example, the speaker may determine which listeners are following what's being said and which are confused, which listeners agree/disagree with what is being said, which listeners have questions, and so on.

Users on primarily text-based communication threads do not have the benefit of seeing one another when their communication messages are being presented. If a user views a message and has a visual reaction to that message while viewing (e.g., makes a facial expression), the user who sent the message is unable to see the visual reaction. As such, the sending user must rely on the receiving user to respond after the fact with an indication of their reaction. In many cases, the receiving user may not indicate their reaction, or may hide their reaction, in their response (if a response is even provided). Even if the user sends a reaction, the reaction will inherently not be a candid reaction of the user from when the user is actively reading the message. The sending use may, therefore, remain in the dark about the receiving user's reaction to their message.

SUMMARY

The technology disclosed herein enables users on text-based communication threads to automatically receive indications of other users' visual reactions to received messages. In a particular example, a method includes receiving, at a first endpoint, a text communication in a text-communication thread from a second endpoint and presenting the text communication to a first user of the first endpoint. The method further includes capturing an image of the first user during presentation of the text communication. The method also includes determining a graphic corresponding to a visual reaction of the first user captured in the image and transmitting the graphic from the first endpoint to the second endpoint for display by the second endpoint in the text-communication thread.

In other examples, an apparatus performs the above-recited method and computer readable storage media directs a processing system to perform the above-recited method.

DETAILED DESCRIPTION

As mentioned above, one of the key advantages of in-person communications is the ability to see participants' reactions and emotions in real-time. When participants are located remotely from one another, participants may use computing devices to communicate. Modern devices allow for video calls/conferences, which leverage cameras to capture video of the participants. Participants' facial expressions, body language, and gestures are likewise included in the captured video. This visual element adds a layer of depth to communication, similar to that of an in-person conversation, allowing participants to pick up on non-verbal cues that play a crucial role in understanding the nuances of a conversation. However, non-video communication modes are still very prevalent.

Text-based communications are still very popular for participants communicating with each other via computing devices. From Short Message Service (SMS) messaging supported by nearly all modern mobile phones to proprietary instant messaging services, including those included in social media/networking services, users of computing devices can send messages with text to other users on the same service. While many of those text-based services allow messages that include media other than text (e.g., images, videos, etc.), the services will not transmit real-time video of a user during a text-based communication. The visual cues provided by real-time video are, therefore, still absent even though a device may be capable of capturing and transmitting real-time video.

The endpoints described in the examples below provide capture visual cues indicating a receiving user's reaction to receiving a communication from another endpoint in a text-based communication thread. Since the text-based communication thread is not a real-time video communication, a user of the sending endpoint cannot view see the user's reaction to viewing the communication. Instead, the receiving user's endpoint captures the user's reaction to select a graphic that represents the reaction. The selected graphic is sent to at least the sending user's endpoint. The sending user can then interpret the graphic to determine the reaction. For example, if the receiving user made a confused expression with their face, the selected graphic may include an emoji drawn to have a similar expression. Upon seeing the emoji, the sending user can infer that the receiving user was confused when viewing the communication.

Figure 1:
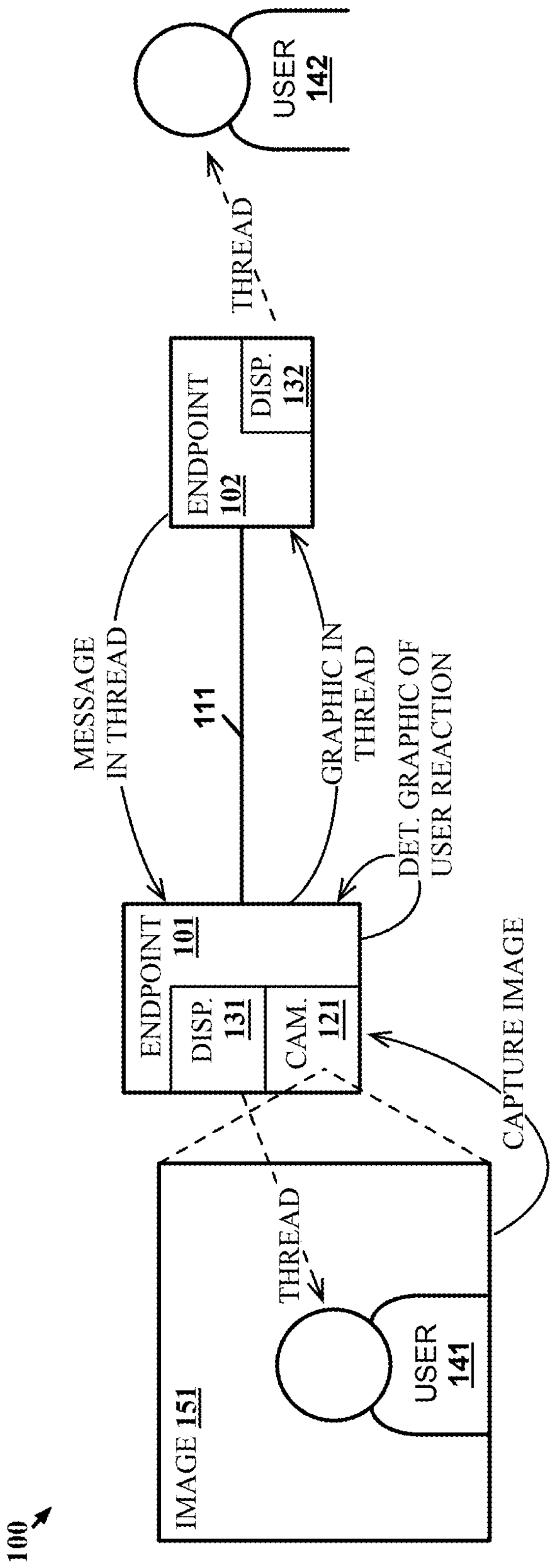
FIG. 1 illustrates an implementation for automatically providing a graphical indication of a user's reaction to a communication sent on a text-based communication thread.

FIG. 1 illustrates implementation 100 for automatically providing a graphical indication of a user's reaction to a communication sent on a text-based communication thread.

Implementation 100 includes endpoint 101 and endpoint 102. Endpoint 101 and endpoint 102 communicate over one or more wired and/or wireless communication links 111. Communication links 111 may be direct links or may include intervening systems, networks, and/or devices. Likewise, endpoint 101 and endpoint 102 my communicate through a communication session system (e.g., communication server) that facilitates exchange of user communications (e.g., text-based chat messages) between endpoints. Endpoint 101 and endpoint 102 may each respectively be a telephone, tablet computer, laptop computer, desktop computer, conference room system, or some other type of computing device capable of establishing real-time user communication sessions between endpoint 101 and endpoint 102. In some examples, endpoint 101 and endpoint 102 may execute a client application thereon that facilitates text-based communications between endpoint 101 and endpoint 102.

In this example, endpoint 101 includes camera 121 which captures images of user 141. The images may be still images or video images. The images are used to determine user 141's reaction to a communication received from user 142 in a text-based communication thread, select a graphic representing that reaction, and send the graphic to endpoint 102. Endpoint 102 displays the graphic in the text-based communication thread. The text-based communication thread is displayed by display 132 of endpoint 102. Display 132 may also display other user interface elements (e.g., those of a client application, an operating system, or other applications executing on endpoint 102). Display 132 (and display 131) may be a Liquid Crystal Display (LCD), a Light-Emitting Diode (LED) display, Organic Light-Emitting Diode (OLED) display, a Cathode Ray Tube (CRT) display, or some other type of display capable of displaying a participant list. Display 132 may be incorporated into a main housing of endpoint 102 or may be connected to endpoint 102 as an external peripheral. Display 131 and camera 121 may similarly be incorporated into a main housing of endpoint 101 or may be connected to endpoint 101 as an external peripheral.

While not shown, endpoint 102 may include a camera enabling endpoint 102 to determine the reaction of user 142 to a communication received from user 141 in the text-based communication thread and determine/transmit a graphic representing that reaction (e.g., reversing the process shown in implementation 100 and explained in operation 200 below).

Figure 2:
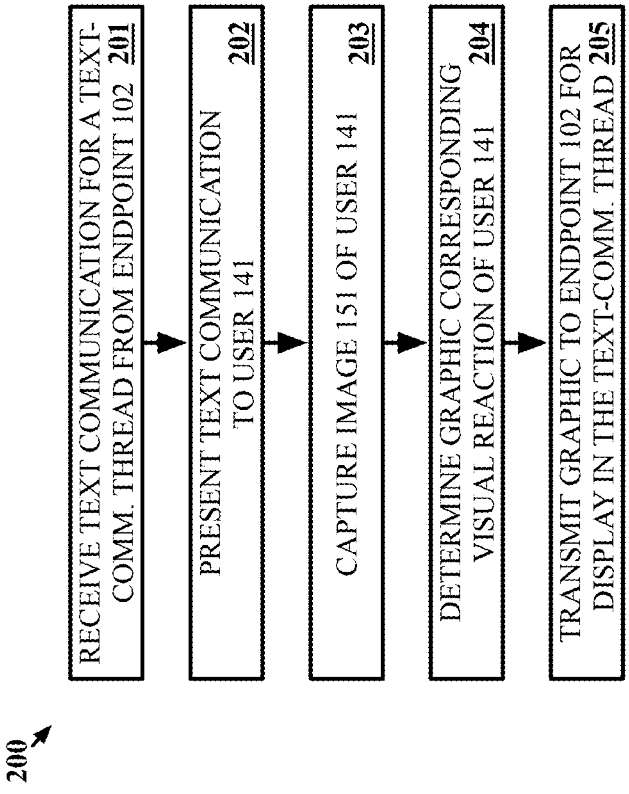
FIG. 2 illustrates an operation to automatically provide a graphical indication of a user's reaction to a communication sent on a text-based communication thread.

FIG. 2 illustrates operation 200 to automatically provide a graphical indication of a user's reaction to a communication sent on a text-based communication thread. In operation 200, endpoint 101 receives a text communication in a text-communication thread (step 201). The text communication may include only text or may include other types of communication media that can be sent in a communication protocol used for exchanging text-based communications in the text-communication thread. For example, the text-communication thread may support text messages, image messages (e.g., photos, graphics, animations, etc.), video messages (e.g., video clips), audio messages (e.g., audio clips), or some other type of communication other than real-time video transmission-including combinations thereof. The text-communication thread may be part of a Short Message Service (SMS), a Multimedia Messaging Service (MMS), Rich Communication Services (RCS), an instant messaging service, a social network (e.g., a direct messaging feature), or some other type of communication service that provides text-based communication between users via the users' devices. In some examples, the text-based communication may include real-time text, which transmits characters in real time as the characters are entered (RFC 4103 for the Session Initiation Protocol (SIP) is one example for real-time text transmission). In such examples, the received communication may refer to the characters that have already been received by endpoint 101. While the communication thread includes two users as participants in this example, the communication thread may include additional participants in other examples.

Endpoint 101 presents the text communication to user 141 (step 202). The text communication may be presented immediately upon receipt or may be presented in response to user 141 directing user 141 to present the text communication. For example, if endpoint 101 is currently displaying the communication thread in which the text communication was received (e.g., in a window or a full screen app), endpoint 101 may immediately present the text communication. If, however, the communication thread is not being displayed, then endpoint 101 may not present the text communication until the user directs endpoint 101 to display the thread (e.g., endpoint 101 may notify user 141 that a new communication has been received and user 141 may direct user 141 to display the communication thread showing the message). Text communication may be displayed by display 131 and/or may be presented via another mechanism. For instance, endpoint 101 may perform text-to-speech processing on the text communication to read out the content of the communication to user 141.

Endpoint 101 captures image 151 of user 141 during presentation of the text communication (step 203). Image 151 may be a still image, a series of still images, a video image, three-dimensional (3D) scan, or some other visual capture of user 141 that enables endpoint 101 to determine user 141's visual reaction. Endpoint 101 may capture images of user 141 during a larger period of time than the period in which the text communication is presented and select image 151 from those captured images when the text communication is presented to user 141. In another example, endpoint 101 may trigger capture of image 151 when the text communication is presented to user 141. In some examples, endpoint 101 may assume user 141 is presented with the text communication as soon as the text communication is presented by endpoint 101 (e.g., may assume that user 141 is looking at display 131 when the text communication is displayed). In other examples, endpoint 101 may collect additional information to better ensure user 141 is actually consuming the presentation of the text communication. For instance, endpoint 101 may collect window management information indicating whether a window displaying the text communication is currently in focus (e.g., is the active window as opposed to merely being displayed while user 141 interacts with another window displayed on display 131). In another example, endpoint 101 may collect gaze information about user 141 via camera 121 or from some other gaze-detection element to determine when user 141 is looking at the window for the communication thread or the text communication specifically. Other, or additional, types of information may also be used by endpoint 101 to better determine that user 141 is actually consuming the text message when image 151 is captured. Similarly, endpoint 101 may analyze video or a series of images to identify when a discernable visual reaction happens. For instance, if user 141 is reading text, it may take some time before user 141 reaches a part that elicits a reaction. In an example, endpoint 101 may recognize that moment as being one where user 141's appearance changes from when the communication was first presented.

Endpoint 101 performs visual processing on image 151 to determine a visual reaction of user 141 when consuming (e.g., reading, seeing, hearing, etc.) the presentation of the text communication and determines a graphic corresponding to that visual reaction (step 204). The reaction is a visual reaction in the sense that it is a reaction that can be identified from the visual information included in image 151. For example, the visual reaction may include one or more facial expressions, gestures (e.g., head movements, hand movements, etc.), or some other visually present action. Other examples may also capture audio of user 141 (e.g., via a microphone of endpoint 101) to augment information captured in image 151. For instance, a frustrated facial expression may be accompanied by an audible groan to confirm the type of facial expression. Endpoint 101 may feed image 151 into a machine learning algorithm trained to output what the algorithm determined to be the reaction of the user. Other types of visual processing algorithms may also be used. In some examples, the visual reaction may describe the appearance of user 141 or may indicate an interpretation of the appearance of user 141. For instance, the visual reaction may indicate user 141 is smiling or may indicate user 141 is happy based on an interpretation of an emotion felt by user 141 when smiling.

The graphic may be an emoticon, an emoji, a photographic image, an avatar, or some other type of graphic that can convey user 141's visual reaction. The graphic may be selected to mimic user 141's appearance (e.g., that user 141 is smiling) or may be selected to clearly represent the interpreted appearance. For example, a graphic with a closed mouth smile may be selected if user 141 reacts with a closed mouth smile while a graphic with a toothy smile may be selected if user 141 reacts with a smile showing teeth. In another example, if endpoint 101 determines user 141 is sad, user 141 may select a graphic that best indicates user 141 is sad even though the graphic may not match user 141's actual appearance. For instance, a sad emoji may include a tear falling from the emoji's face. That sad emoji may be selected when endpoint 101 determines user 141 is sad even though image 151 does not show user 141 as sheading a tear. Endpoint 101 may maintain predefined relationships between possible visual reactions that can be determined from image 151 and respective graphics. The relationships may be selected by user 141 and/or by some other entity (e.g., by a developer).

The selected graphic is transmitted from endpoint 101 to endpoint 102 for display in the text-communication thread as displayed by display 132 at endpoint 102 (step 205). The graphic may be transmitted substantially in real time with the presentation of the text communication to user 141. The graphic is transmitted in accordance with a protocol supported by the text-communication thread. For example, if the text-communication thread only supports a given image file type, endpoint 101 transmits the graphic in that file type. The graphic may be included in the communication thread as though user 141 manually entered the graphic into the thread (e.g., manually selected a graphic for sharing over the thread from a library of graphics) rather than having the graphic automatically selected and transmitted.

In some examples, an indication of the graphic may be transmitted in place of the graphic itself. Transmission of an indication in place of the graphic is especially beneficial in scenarios where the text-communication thread only supports exchange of characters (e.g., a text-only protocol like SMS is used) or where limited bandwidth is available for communications. For example, predefined character strings may be assigned to different graphics. Each endpoint supporting the graphic/string combinations locally stores a library of the graphics such that the graphics themselves need not be sent. Rather, an endpoint can simply recognize a character string and display the corresponding graphic stored in the local library. Emojis are an example where an indication is transmitted rather than a graphic. Specifically, Unicode defines unique character sequences that correspond to different emojis. Endpoint 102 includes a library of the actual emoji graphics along with respective character sequences. Endpoint 101 need only send the character sequence for the selected emoji and endpoint 102, upon receiving that sequence, will display the corresponding emoji graphic. In other examples, emoticons may be used, which comprise traditional text characters (e.g., ASCII characters) presented in a sequence such that the characters themselves appear to be a graphic (e.g., the character string :-) may be used to show user 141 is happy). Thus, like emojis, emoticons can be sent using text characters without having to send an image file. Other examples where the characters themselves convey the reaction may also be used (i.e., the characters are displayed rather than not displayed but, instead, used to identify a graphic for display, as is the case with emojis). For instance, the characters may spell out the reaction (e.g., [happy], [sad], [laughing], [crying], [coughing], etc., with the brackets in this case indicating that the words are a captured reaction rather than user 141 typing out the words themselves).

Advantageously, user 142 is able to get near immediate visual feedback regarding user 141's reaction to the text communication from user 142 even though user 142 is not able to view user 141's actual appearance due to limitations of the text-based communication thread. When presented by endpoint 102, the graphic received from endpoint 101 may be included in the communication thread in the order in which it was received much like any manual response from user 141 may be included (e.g., may be displayed as a message appearing to be from user 141 in response to user 142's message). The graphic may similarly be shown in the thread at endpoint 101 to inform user 141 that the graphic was sent as a message in the thread or the graphic may be hidden from the thread at endpoint 101 (e.g., user 141 may prefer not to see what is sent). In some cases, endpoint 101 may include an indication that the graphic was selected and sent automatically. Endpoint 102 may then display a notification to user 142 that the graphic was sent automatically since user 142 may otherwise assume user 141 sent the graphic manually (e.g., may display "this graphic automatically generated" nearby the graphic in the communication thread at endpoint 102).

Instructions for endpoint 101 to perform the automatic image capture, graphic selection, and graphic transmission steps described above may be included in a client application for the text-communication thread (e.g., a messaging application executing on endpoint 101) or may be part of a separate process executing on endpoint 101 with access to the communication thread (e.g., to identify receipt of a communication and send a selected graphic). In some examples, at least a portion of the processing necessary to identify a graphic may be offloaded to a different computing system, such as a server facilitating the communication thread.

In some examples, steps 203-204 may repeat while the text communication is displayed to user 141. If the visual reaction changes during user 141's consumption of the communication, endpoint 101 may select and transmit a different graphic to endpoint 102. For instance, a message from endpoint 102 may start out with something that makes user 141 make an angry expression and endpoint 101 may transmit a graphic showing to user 142 that user 141 is angry. Subsequently, something in the same message may cause user 141 to become happy and begin to smile. Endpoint 101 may then follow up with a graphic showing to user 142 that user 141 is now happy.

Endpoint 101 may provide user 141 with the option to automatically send graphics representing user 141's reaction. Since user 141 may not want to have their reaction sent automatically, user 141 may select the option only when sending of their reaction is desired. In some cases, user 141 may be able to select specific message threads or specific users that should receive reactions. For instance, friends and family of user 141 may automatically receive the reactions while people who are not designated friends and family will not.

In some examples, other types of media may be stored locally similar to graphics like emojis and identifiers for the desired media selection can be sent instead of the media itself. For example, endpoint 102 may store a local library of audio selections (e.g., files) representative of possible user reactions (e.g., laughing, crying, groaning, etc.). Endpoint 101 may send a character string corresponding to an audio selection of user 141's reaction to reading a message from endpoint 102. Upon receiving the character string, endpoint 102 retrieves the corresponding audio selection from local memory and plays the audio selection to user 142. The audio selection in some examples may accompany the graphic. Video selections or animated gifs may similarly be stored locally and may be displayed in response to receiving a corresponding character string.

Figure 3:
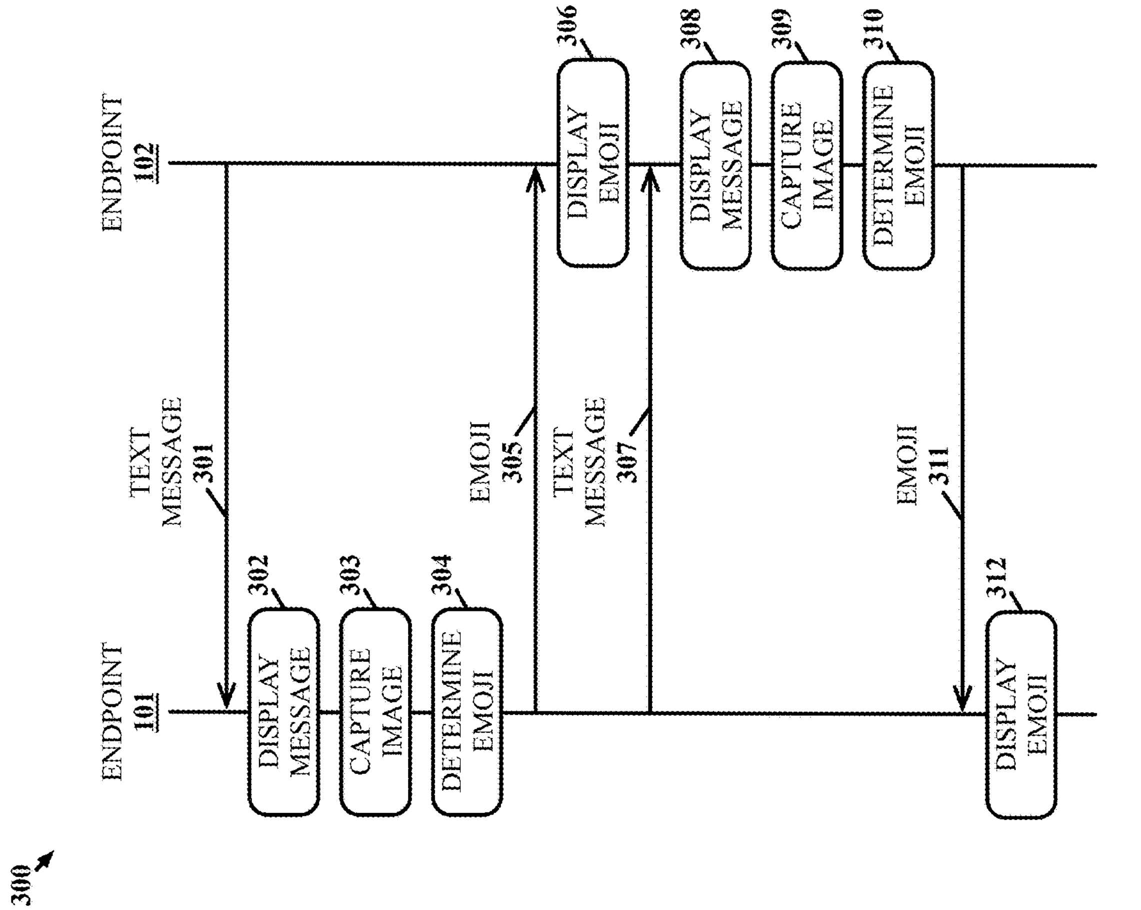
FIG. 3 illustrates an operational scenario for automatically providing a graphical indication of a user's reaction to a communication sent on a text-based communication thread.

FIG. 3 illustrates operational scenario 300 for automatically providing a graphical indication of a user's reaction to a communication sent on a text-based communication thread. In operational scenario 300, endpoint 102 includes a camera like camera 121 of endpoint 101. As such, both endpoint 101 and endpoint 102 are capable of capturing images of their respective users. Also, in this example, the graphics selected by endpoints 101-102 are emojis but similar steps may be used with other types of graphics.

In operational scenario 300, endpoint 102 transmits a text message entered by user 142 into a user interface (e.g., onscreen keyboard) of endpoint 102 (step 301). Endpoint 101 displays the message in a text message thread associated with user 142 (step 302). While user 141 is reading the message, endpoint 101 uses camera 121 to capture an image of user 141 (step 303). Endpoint 101 selects an emoji corresponding to a visual reaction of user 141 captured in the image (step 304). Endpoint 101 automatically transmits the selected emoji in the text message thread to endpoint 102 as a response to the text message received from endpoint 102 (step 305). Due to the nature of emojis being represented by Unicode character sequences, endpoint 101 transmits the code corresponding to the selected emoji rather than a graphic of the emoji.

Endpoint 102 receives the character sequence, recognizes the character sequence as corresponding to the emoji, and displays the emoji in the text message thread (step 306). The emoji is displayed as a response from user 141 even though user 141 did not personally select and send the emoji. After endpoint 102 receives and displays the emoji, a text message is sent from endpoint 101 to endpoint 102 (step 307). The text message may be user 141's response to user 142's message or may be a message about some other subject. In some examples, user 142 may respond to the emoji sent by endpoint 101 in the text thread before user 141 has the opportunity to send the text message of step 307. For example, the emoji may indicate that user 141 became angry while reading user 142's message and user 142 may attempt to assuage that anger with a subsequent message before user 141 can reply.

In response to endpoint 102 receiving the text message from endpoint 101, endpoint 102 displays the text message to user 142 (step 308). While user 142 is reading the text message, endpoint 102 captures an image of user 142 using a camera of endpoint 102 (step 309). Endpoint 102 determines a visual reaction of user 142 from the image and selects an emoji representing that reaction (step 310). The selected emoji is sent from endpoint 102 to endpoint 101 in the text thread (step 311). Like the emoji transmitted from endpoint 101, endpoint 102 transmits the code corresponding to the selected emoji instead of the emoji graphic. Upon receiving the code, endpoint 101 identifies the emoji graphic corresponding to the code and displays the graphic as the next message in the text thread from endpoint 102 (step 312).

While the messages in the above example are text messages, the messages may include other types of content. For instance, a message may include a photo or a Uniform Resource Locator (URL) directing to an online news article. Visual reactions to such messages may also be beneficial to the sending user.

Figure 4:
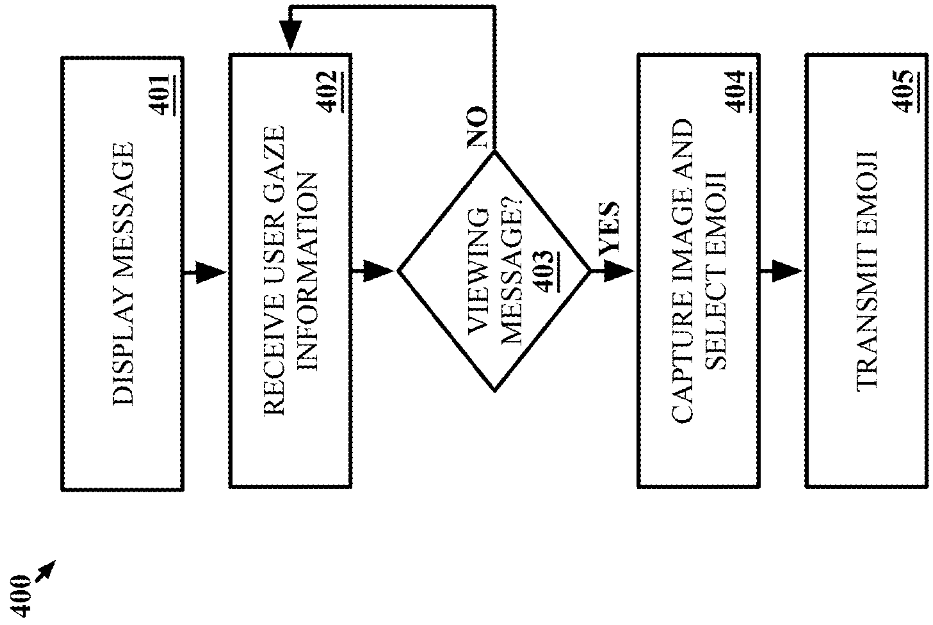
FIG. 4 illustrates an operation to automatically provide a graphical indication of a user's reaction to a communication sent on a text-based communication thread.

FIG. 4 illustrates an operation 400 to automatically provide a graphical indication of a user's reaction to a communication sent on a text-based communication thread. Operation 400 is an example where endpoint 101 uses gaze detection to determine when user 141 is viewing a message received from endpoint 102. Since it is possible that user 141 may not be viewing a message when endpoint 101 is displaying the message, endpoint 101 may be equipped to detect the location of user 141's gaze on display 131. Without gaze detection, endpoint 101 may capture an image of user 141 that is not representative of user 141's visual reaction to a displayed message.

In operation 400, endpoint 101 displays a message received from endpoint 102 (step 401). During display of the message, endpoint 101 receives user gaze information (step 402). The gaze information may include images captured from camera 121 or information captured by another component of endpoint 101 (e.g., dedicated eye tracking hardware). Endpoint 101 processes the gaze information to determine whether user 141 is viewing the message on display 131 (step 403). In some examples, endpoint 101 may determine whether user 141 is looking at display 131, which may be beneficial when the message is being displayed in a full screen app (e.g., on a smartphone). In other examples, endpoint 101 may determine whether user 141 is looking at an application window containing the message or may be able to determine whether user 141 is looking at the message specifically (e.g., rather than some other message in the displayed thread). If endpoint 101 determines user 141 is not viewing the message, then operation 400 returns to step 402 where endpoint 101 continues to receive gaze information to determine when user 141 looks at the message. In some examples, operation 400 may stop if endpoint 101 stops displaying the message (e.g., user 141 closes out of the messaging application before looking at the message).

When the gaze information indicates user 141 is viewing the displayed message, endpoint 101 captures an image of user 141 and selects an emoji corresponding to user 141's visual reaction captured in the image (step 404). Endpoint 101 transmits the selected emoji to endpoint 102 in a message for the communication thread (step 405).

Figure 5:
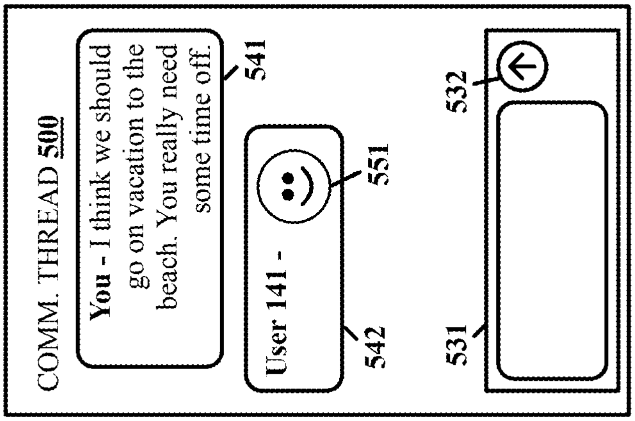
FIG. 5 illustrates a communication thread in which a graphical indication is automatically provided of a user's reaction to a communication sent on a text-based communication thread.

FIG. 5 illustrates communication thread 500 in which a graphical indication is automatically provided of a user's reaction to a communication sent on a text-based communication thread. Communication thread 500 is a text-based communication thread where user communications between user 141 and user 142 are presented in the order in which the messages were sent. Communication thread 500 is an example thread that may be displayed by display 132 of endpoint 102. The "you" in communication thread 500, therefore, refers to user 142. Communication thread 500 only shows two messages, sent message 541 and received message 542, but user 142 may be able to scroll up in communication thread 500 to view messages exchanged prior to sent message 541 and received message 542. Communication thread 500 may be a window within a desktop graphical user interface displayed, may be a full screen messaging application view, or may be some other type of display element. Message entry area 531 is an interface location where user 142 can enter text for a message into communication thread 500. Send button 532, when pressed, sends the entered text to user 141 over communication thread 500. While not shown, message entry area 531 may include options allowing user 142 to select other types of media to send via communication thread 500, such as images, files, emojis, etc.

Sent message 541 is an example message send from user 142 using endpoint 101 to user 141 that may elicit a visual reaction from user 141 when user 141 reads sent message 541. Endpoint 101 is configured to automatically capture an image of user 141 when sent message 541 is presented on display 131 and selects graphic 551 to represent user 141's visual reaction. Graphic 551 is sent by endpoint 101 in received message 542 of communication thread 500 to endpoint 102 for display in communication thread 500 as shown. When seeing graphic 551, user 142 likely concludes that sent message 541 made user 141 appear happy due to graphic 551 showing a smiling face. In this example, there is no indication given that graphic 551 was automatically sent in received message 542 rather than user 141 manually selecting and sending graphic 551. Although, in other examples, communication thread 500 may present an indication that graphic 551 was sent automatically.

Figure 6:
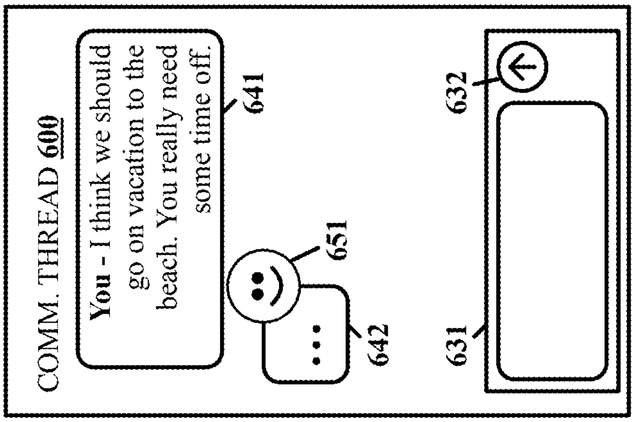
FIG. 6 illustrates a communication thread in which a graphical indication is automatically provided of a user's reaction to a communication sent on a text-based communication thread.

FIG. 6 illustrates communication thread 600 in which a graphical indication is automatically provided of a user's reaction to a communication sent on a text-based communication thread. Is another example of a communication thread that may be displayed by display 132 of endpoint 102. Similar to communication thread 500, communication thread 600 includes message entry area 631, send button 632, and sent message 641. In this example, upon endpoint 101 determining graphic 651 from an image captured of user 141 when reading sent message 641, endpoint 101 transmits graphic 651 when user 141 begins typing a response to user 142. The messaging protocol(s) used by communication thread 600 support notifications when a user is typing. Therefore, when user 141 begins typing a response to user 142, endpoint 101 signals endpoint 102 to notify user 142 that user 141 is typing. This causes endpoint 102 to display typing notification 642. Using a mechanism similar to what endpoint 101 used to signal endpoint 102 that user 141 is typing, endpoint 101 sends a signal including graphic 651 for presentation with typing notification 642.

In other examples, the communication protocols may support the ability of a user to explicitly indicate a reaction to messages in the communication thread, such as the ability to thumbs up or thumbs down a message. In those examples, graphic 651 may be displayed on sent message 641 instead in a manner similar to that shown for typing notification 642 in communication thread 600.

Figure 7:
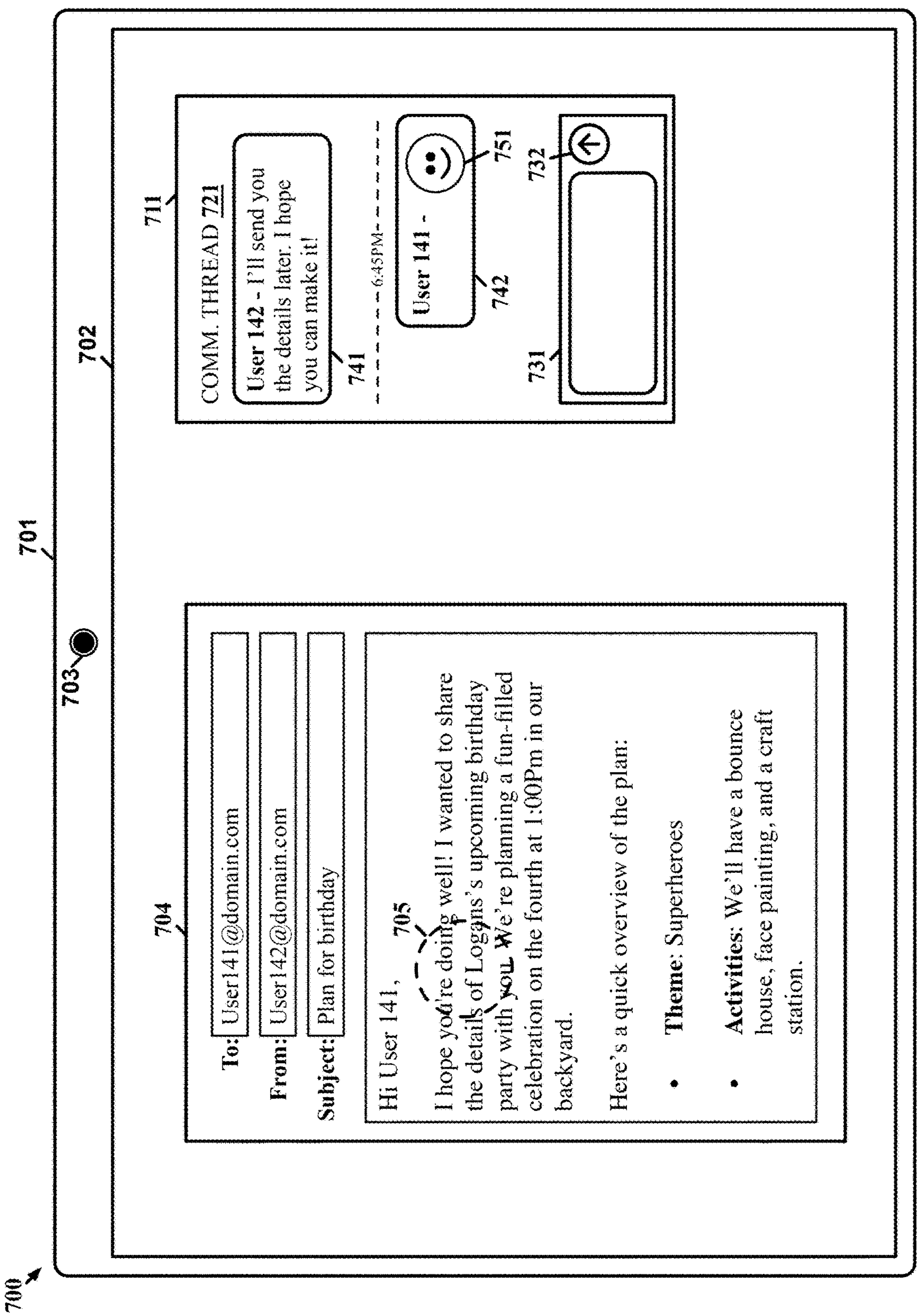
FIG. 7 illustrates display system for automatically providing a graphical indication of a user's reaction over a text-based communication thread.

FIG. 7 illustrates display system 700 for automatically providing a graphical indication of a user's reaction over a text-based communication thread. Display system 700 is an example of display 131 of user 141. Display system 700 includes display housing 701, which houses display screen 702 and camera 703. Display system 700 may be a laptop screen, tablet screen, external monitor, screen for an all-in-one desktop computer, or some other type of display for endpoint 101. Display screen 702 is currently displaying email window 704 and chat window 711. Email window 704 is showing an email from user 142 to user 141 with a birthday plan. Chat window 711 is showing communication thread 721. Communication thread 721 is similar to communication threads 500-600 and includes message entry area 731 with send button 732. In this example, received message 741 is contextually related to the email message in email window 704 but that need not be the case in other examples. Communication thread 721 also shows a time break indicating that sent message 742 is sent some time after received message 741 was received.

Display system 700 further shows gaze location 705, which is not something displayed by display screen 702. Rather, gaze location 705 represents an example location in which user 141 is looking while email window 704 is open, as determined in operation 800 below.

Figure 8:
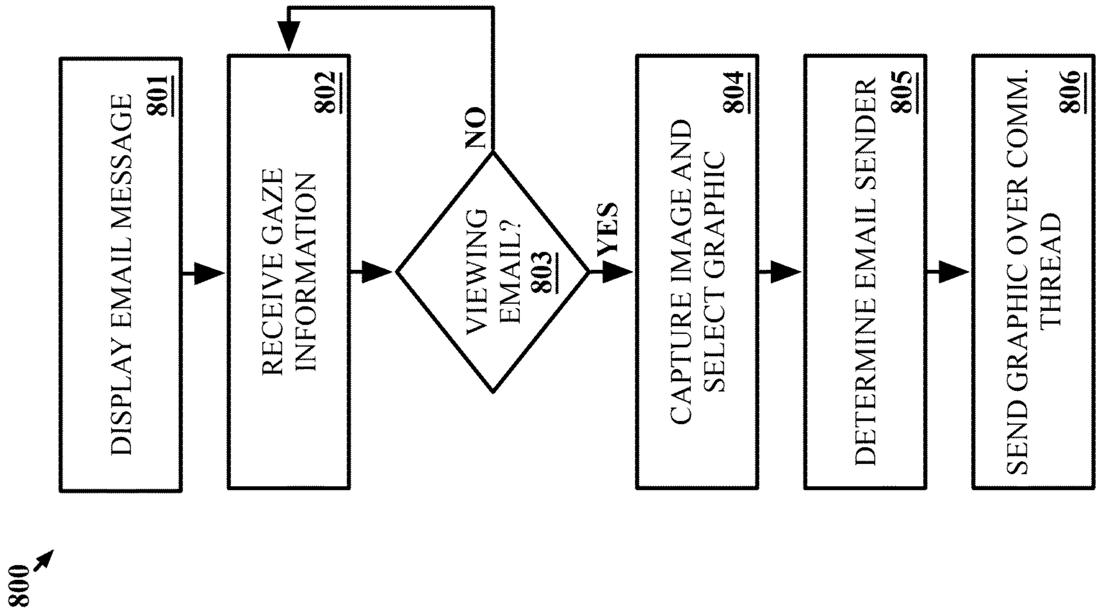
FIG. 8 illustrates an operation to automatically provide a graphical indication of a user's reaction over a text-based communication thread.

FIG. 8 illustrates operation 800 to automatically provide a graphical indication of a user's reaction over a text-based communication thread. Operation 800 is an example where the reactions sent over text-based communication thread are reactions to content outside of the thread. In this example, that other content is an email message displayed in email window 704 but content received in other communication modes may also be used. The other content may even be messages from a different communication thread (e.g., a reaction may be sent on a one-on-one thread to a message received on a group thread).

In operation 800, endpoint 101 displays the email message in email window 704 (step 801). The email message may be displayed upon user 141 selecting the email from an email inbox window or selecting a notification that the email has been received. Endpoint 101 receives gaze information regarding where user 141 is focusing their gaze (step 802). The gaze information is received via camera 703 in this example but may be received from some other component in other examples. From the gaze information, endpoint 101 determines whether user 141 is viewing an item of content to which endpoint 101 is configured to automatically capture user 141's reaction (e.g., the email in this example) (step 803). In some examples, user 141 may provide input to endpoint 101 defining which types of communications (and/or from which people) should trigger automatic reaction capture.

If the gaze information indicates that user 141 is not viewing the email, endpoint 101 returns to step 802 to continue receiving gaze information. In this example, endpoint 101 determines gaze location 705 is where user 141 is looking and that gaze location 705 is over the email in email window 704. The determination of gaze location 705, therefore, triggers endpoint 101 to capture an image of user 141 via camera 703 and select graphic 751 representing user 141's visual reaction in the image to viewing the email (step 804). In some examples, endpoint 101 may be triggered by the gaze information indicating user 141 is looking anywhere within email window 704, is looking at a body of the email message in email window 704, or is looking at some other relevant location. Graphic 751 is selected in the same manner as described above even though the viewed content is not in the thread in which graphic 751 will be sent.

Endpoint 101 determines user 142 is the sender of the email that user 141 is viewing (step 805). For example, a software component executing on endpoint 101 to perform the gaze detection and graphic selection may have access to read at least the from field of the email in email window 704 to determine the email address from which the email was received, if not the name of the sender. The information in the from field may be referenced against contacts information of user 141 to determine that the email is from user 142 and determine contact information (e.g., username, handle, phone number, etc.) for user 142 in a protocol for communication thread 721. In this example, communication thread 721 already exists with user 142, so endpoint 101 sends graphic 751 to endpoint 102 in communication thread 721 (step 806). In situations where a thread does not already exist, endpoint 101 may create a new thread with user 142 before sending sent message 742. Endpoint 102 will display sent message 742 in a display of communication thread 721 at endpoint 102. Communication thread 721 may display sent message 742 in a manner similar to that of received message 542 of communication thread 500.

In this example, chat window 711 is open when sent message 742 is sent. In other examples, communication thread 721 may not be shown in a window (e.g., may be in the background) but endpoint 101 may still send sent message 742. In further examples, chat window 711 may open when endpoint 101 automatically sends sent message 742 or endpoint 101 may notify user 141 that sent message 742 was sent using some other mechanism (e.g., a popup alert).

In some examples, context may be provided in sent message 742 along with graphic 751. If user 142 just sees graphic 751, user 142 may not know what graphic 751 is referencing. In this example, since graphic 751 was determined when user 141 was reading the email message in email window 704, endpoint 101 may indicate that graphic 751 relates to the email. For instance, endpoint 101 may include "Reading email with subject 'Plan for birthday'" in sent message 742 or may send the text in a separate message to accompany sent message 742.

Figure 9:
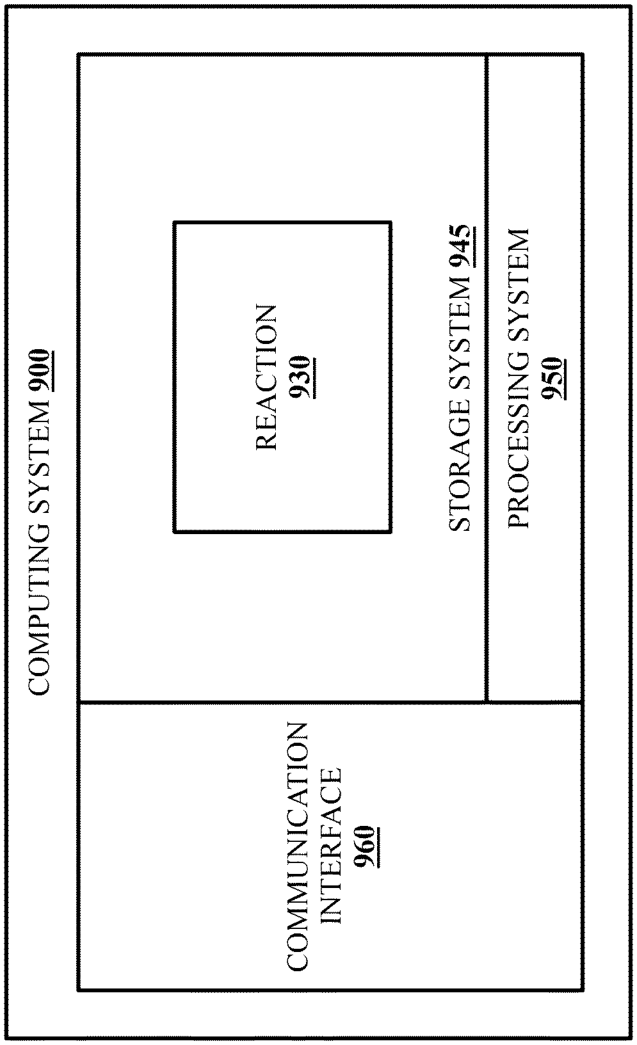
FIG. 9 illustrates a computing system for automatically providing a graphical indication of a user's reaction over a text-based communication thread.

FIG. 9 illustrates computing system 900 for automatically providing a graphical indication of a user's reaction over a text-based communication thread. Computing system 900 is representative of any computing system or systems with which the various operational architectures, processes, scenarios, and sequences disclosed herein can be implemented. Computing system 900 is an example architecture for endpoints 101-102, although other examples may exist. Computing system 900 includes storage system 945, processing system 950, and communication interface 960. Processing system 950 is operatively linked to communication interface 960 and storage system 945. Communication interface 960 may be communicatively linked to storage system 945 in some implementations. Computing system 900 may further include other components such as a battery and enclosure that are not shown for clarity.

Communication interface 960 comprises components that communicate over communication links, such as network cards, ports, radio frequency (RF), processing circuitry and software, or some other communication devices. Communication interface 960 may be configured to communicate over metallic, wireless, or optical links. Communication interface 960 may be configured to use Time Division Multiplex (TDM), Internet Protocol (IP), Ethernet, optical networking, wireless protocols, communication signaling, or some other communication format—including combinations thereof. Communication interface 960 may be configured to communicate with one or more web servers and other computing systems via one or more networks.

Processing system 950 comprises microprocessor and other circuitry that retrieves and executes operating software from storage system 945. Storage system 945 may include volatile and nonvolatile, removable, and non-removable media implemented in any method or technology for storage of information, such as computer readable instructions, data structures, program modules, or other data. Storage system 945 may be implemented as a single storage device but may also be implemented across multiple storage devices or sub-systems. Storage system 945 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no interpretations would storage media of storage system 945, or any other computer-readable storage medium herein, be considered a transitory form of signal transmission (often referred to as "signals per se"), such as a propagating electrical or electromagnetic signal or carrier wave.

Processing system 950 is typically mounted on a circuit board that may also hold the storage system. The operating software of storage system 945 comprises computer programs, firmware, or some other form of machine-readable program instructions. The operating software of storage system 945 comprises reaction module 930. The operating software on storage system 945 may further include an operating system, utilities, drivers, network interfaces, applications, or some other type of software. When read and executed by processing system 950, the operating software on storage system 945 directs computing system 900 to automatically provide a graphical indication of a user's reaction over a text-based communication thread.

In at least one example, reaction module 930 directs processing system 950 to receive a communication in the text-communication thread from the second endpoint and present the communication to a first user. Reaction module 930 also directs processing system 950 to capture an image of the first user during presentation of the communication. Reaction module 930 also directs processing system 950 to determine an graphic corresponding to a visual reaction of the first user captured in the image and transmit the graphic to the second endpoint for display by the second endpoint in the text-communication thread.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for displaying user reactions in a text-communication thread including communications between a first endpoint and a second endpoint, the method comprising:

receiving, at the first endpoint, a text communication in the text-communication thread from the second endpoint;

presenting the text communication to a first user of the first endpoint;

capturing an image of the first user during presentation of the text communication;

determining a graphic corresponding to a visual reaction of the first user captured in the image, wherein the graphic corresponds to a character string; and transmitting the character string from the first endpoint to the second endpoint, wherein the second endpoint determines the graphic corresponds to the character string and displays the graphic in the text-communication thread.

2. The method of claim 1, wherein the second endpoint displays the graphic in the text-communication thread along with other messages of the text-communication thread in an order in which the graphic was received by the second endpoint.

3. The method of claim 1, wherein the second endpoint displays an indication that the graphic was automatically transmitted from the first endpoint.

4. The method of claim 1, wherein determining the graphic comprises:

determining a facial expression of the first user in the image; and identifying the graphic representing the facial expression from a plurality of graphics available for transmission.

5. The method of claim 1, wherein the graphic is an emoji and wherein the character string comprises a Unicode character sequence corresponding to the emoji.

6. The method of claim 1, wherein the graphic is an emoticon comprising ASCII characters and wherein transmitting the character string comprises:

transmitting the ASCII characters as a message in the text-communication thread.

7. The method of claim 1, wherein the graphic is transmitted while the first user is reading the text communication and prior to the first user sending a response to the text communication.

8. The method of claim 1, comprising:

after transmitting the graphic, capturing a second image of the first user during presentation of the text communication;

determining a second graphic corresponding to the second image; and transmitting the second graphic from the first endpoint to the second endpoint in the text-communication thread.

9. The method of claim 1, comprising:

performing gaze detection on the first user; and triggering the capturing of the image when the gaze detection indicates the first user is viewing the text communication.

10. The method of claim 1, comprising:

receiving, from the first user, user input of a response to the text communication; and notifying the second endpoint that the user input is being received, wherein the graphic is displayed by the second endpoint with a notifier that the first user is providing the user input.

11. The method of claim 1, wherein the graphic is hidden from the text-communication thread at the first endpoint.

12. The method of claim 1, comprising:

transmitting a second text communication in the text-communication thread from the first endpoint to the second endpoint; and receiving, at the first endpoint, a second graphic in the text-communication thread from the second endpoint, wherein the second graphic corresponds to a second visual reaction of a second user of the second endpoint captured in a second image during presentation of the second text communication at the second endpoint.

13. The method of claim 1, comprising:

receiving, at the first endpoint, a second communication in a different communication mode from the text-communication thread;

presenting the second communication to the first user at the first endpoint;

capturing a second image of the first user during presentation of the second communication;

determining a second graphic corresponding to a second visual reaction of the first user captured in the second image;

determining the second communication is sent from a second user of the second endpoint; and transmitting the second graphic from the first endpoint to the second endpoint for display by the second endpoint in the text-communication thread.

14. An apparatus implementing a first endpoint for displaying user reactions in a text-communication thread including communications between the first endpoint and a second endpoint, the apparatus comprising:

one or more computer readable storage media;

a processing system operatively coupled with the one or more computer readable storage media; and program instructions stored on the one or more computer readable storage media that, when read and executed by the processing system, direct the apparatus to:

receive a communication in the text-communication thread from the second endpoint;

present the communication to a first user;

capture an image of the first user during presentation of the communication;

determine an emoji corresponding to a visual reaction of the first user captured in the image; and transmit the emoji to the second endpoint for display by the second endpoint in the text-communication thread.

15. The apparatus of claim 14, wherein the second endpoint displays the emoji in the text-communication thread along with other messages of the text-communication thread in an order in which the emoji was received by the second endpoint.

16. The apparatus of claim 14, wherein to transmit the emoji, the program instructions direct the apparatus to:

transmitting a Unicode character sequence corresponding to the emoji.

17. The apparatus of claim 14, wherein the program instructions direct the apparatus to:

detect a gaze of the first user being directed at the communication; and capture the image in response to the gaze being directed at the communication.

18. The apparatus of claim 14, wherein the program instructions direct the apparatus to:

before the emoji is transmitted to the second endpoint, determining a user-selectable option to automatically transmit emojis representing visual reactions is selected.

19. The apparatus of claim 14, wherein the image comprises one or more frames of a video.

20. One or more non-transitory computer readable storage media having program instructions stored thereon for displaying user reactions in a communication thread, when read and executed by a processing system, direct the processing system to:

receive a message in the communication thread from a second endpoint of the communication thread;

present the message to a first user;

capture an image of the first user during presentation of the message;

determine an emoji corresponding to a visual cue of the first user captured in the image; and transmit the emoji to the second endpoint for display by the second endpoint in the communication thread.

* * * * *